(12) United States Patent
Riedner et al.

(10) Patent No.: US 6,448,566 B1
(45) Date of Patent: Sep. 10, 2002

(54) SCINTILLATOR ARRAYS FOR RADIATION DETECTORS AND METHODS FOR MAKING SAME

(75) Inventors: Robert J. Riedner, Waukesha, WI (US); David M. Hoffman, New Berlin, WI (US); Richard J. Ruzga, Mukwonago, WI (US); Eti Ganin, Whitefish Bay, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/681,301

(22) Filed: Mar. 15, 2001

(51) Int. Cl.$^7$ ................................................ G01T 1/24
(52) U.S. Cl. ................................. 250/483.1; 250/487.1
(58) Field of Search ....................... 250/483.1, 484.4, 250/486.1, 487.1, 361 R, 362; 252/301.4 R, 301.4 F, 301.36; 264/21

(56) References Cited

U.S. PATENT DOCUMENTS

| | | | |
|---|---|---|---|
| 4,783,596 A | 11/1988 | Riedner et al. | |
| 5,013,921 A | * 5/1991 | Bruening et al. | 250/370.11 |
| 5,057,692 A | 10/1991 | Greskovich et al. | |
| 5,521,387 A | 5/1996 | Riedner et al. | |
| 6,115,448 A | 9/2000 | Hoffman | |
| 6,134,292 A | 10/2000 | Hsieh | |
| 6,137,857 A | 10/2000 | Hoffman et al. | |
| 6,173,031 B1 | 1/2001 | Hoffman et al. | |
| 6,245,184 B1 | 6/2001 | Riedner et al. | |

* cited by examiner

Primary Examiner—Scott J. Sugarman
Assistant Examiner—Richard Hanig
(74) Attorney, Agent, or Firm—Carl B. Horton, Esq.; Armstrong Teasdale LLP

(57) ABSTRACT

To provide simpler, more efficient methods for making scintillator arrays, one embodiment of the present invention is a method for making a scintillator array. The method includes extruding a mixture of a scintillator powder and a binder into rods; laminating the extruded rods with a sinterable reflector material; and sintering the laminated rods and reflector material into a scintillator block. Scintillator array embodiments of the present invention are useful in many types of pixelated radiation detectors, such as those used in computed tomography systems.

24 Claims, 4 Drawing Sheets

SCINTILLATOR ARRAYS FOR RADIATION DETECTORS AND METHODS FOR MAKING SAME

BACKGROUND OF INVENTION

This invention relates generally to methods for making scintillator arrays used in radiation detectors, and to the scintillator arrays made from these methods.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

Detectors of CT and other types of x-ray imaging systems utilize scintillation detectors having pixelated scintillator arrays. It would therefore be desirable to provide simplified, inexpensive methods for making such arrays, and to provide inexpensive, pixelated scintillator arrays for CT and other imaging applications.

SUMMARY OF INVENTION

To provide simpler, more efficient methods for making scintillator arrays, one embodiment of the present invention is a method for making a scintillator array.

The method includes extruding a mixture of a scintillator powder and a binder into rods; laminating the extruded rods with a sinterable reflector material; and sintering the laminated rods and reflector material into a scintillator block. Scintillator array embodiments of the present invention are useful in many types of pixelated radiation detectors, such as those used in computed tomography systems.

DETAILED DESCRIPTION

Figure 1:
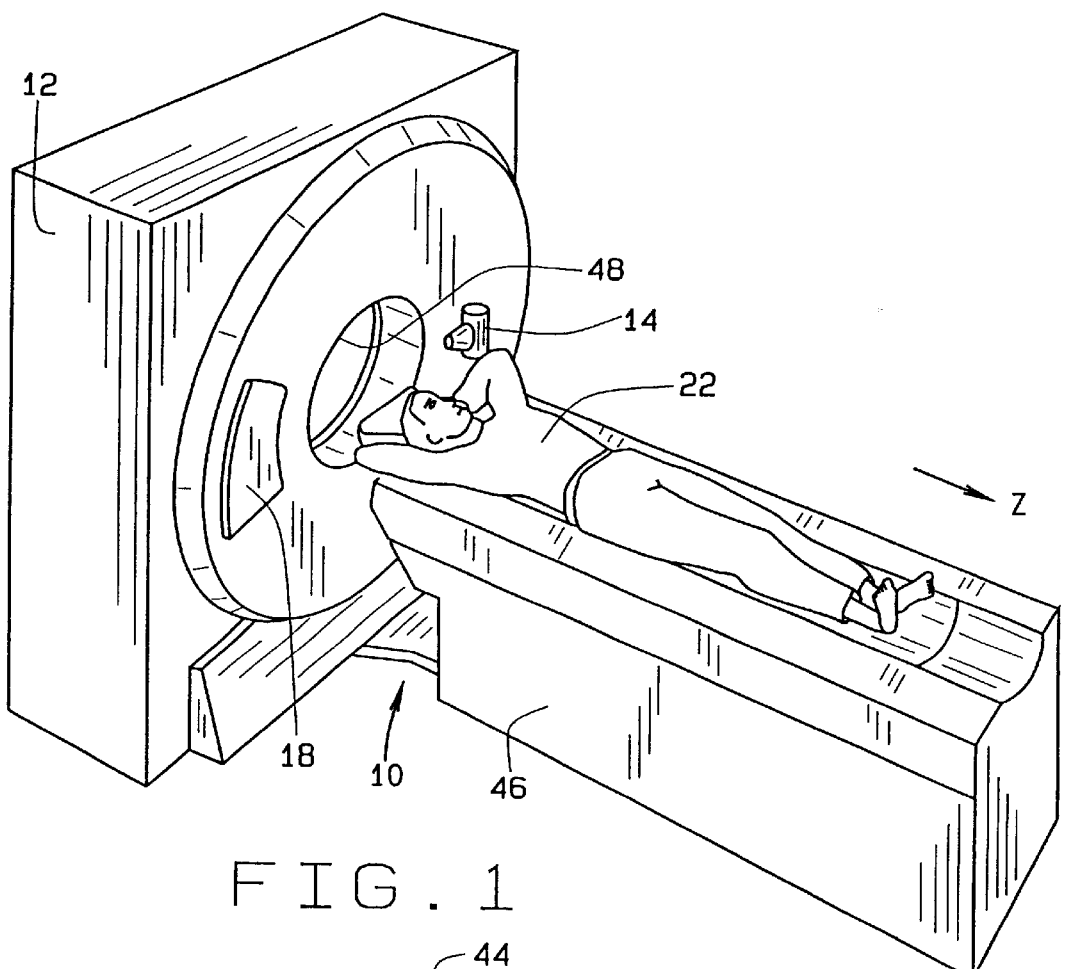
FIG. 1 is a pictorial view of a CT imaging system.
Figure 2:
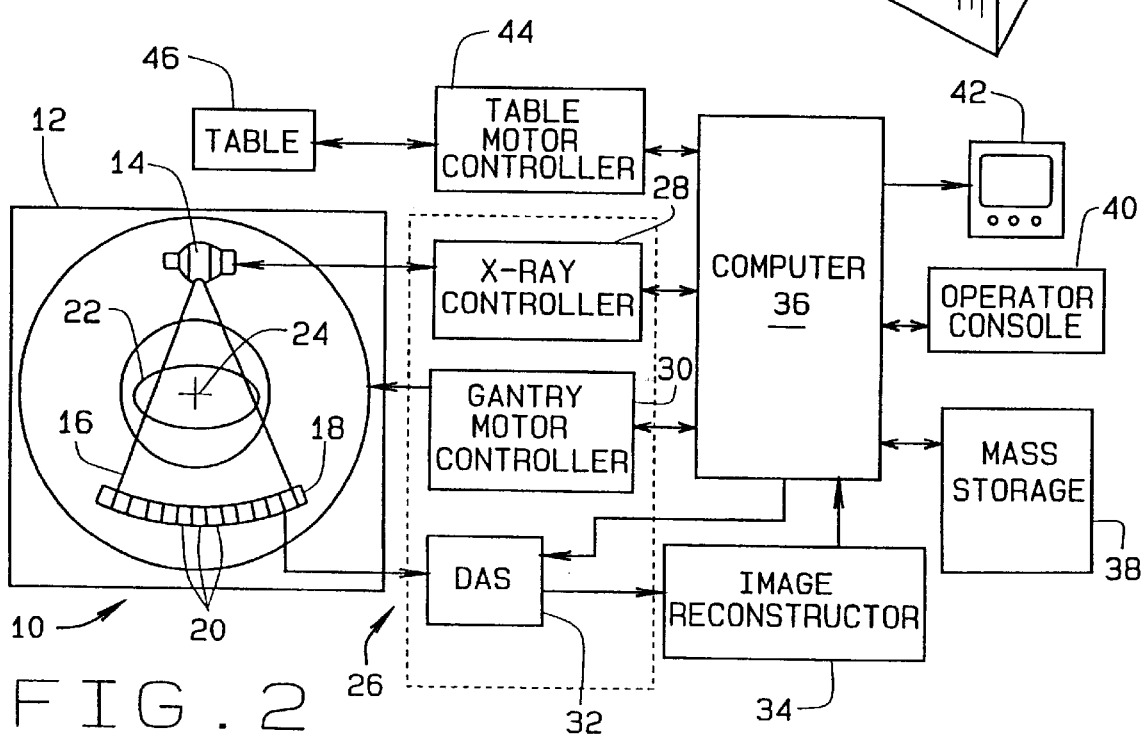
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a radiation detector array 18 on the opposite side of gantry 12. Detector array 18 is formed by detector elements 20 which together sense the projected x-rays that pass through an object 22, for example a medical patient. Detector array 18 may be fabricated in a single slice or multi-slice configuration. In one embodiment of the present invention, and as described below, detector elements 20 comprise sintered scintillator elements. Each scintillator element produces light in response to x-ray radiation, which is converted to an electrical signal by a sensing region of a semiconductor array optically coupled thereto. Each detector element 20 produces an electrical signal that represents the intensity of an impinging x-ray beam on that detector element and hence the attenuation of the beam as it passes through patient 22 at a corresponding angle. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
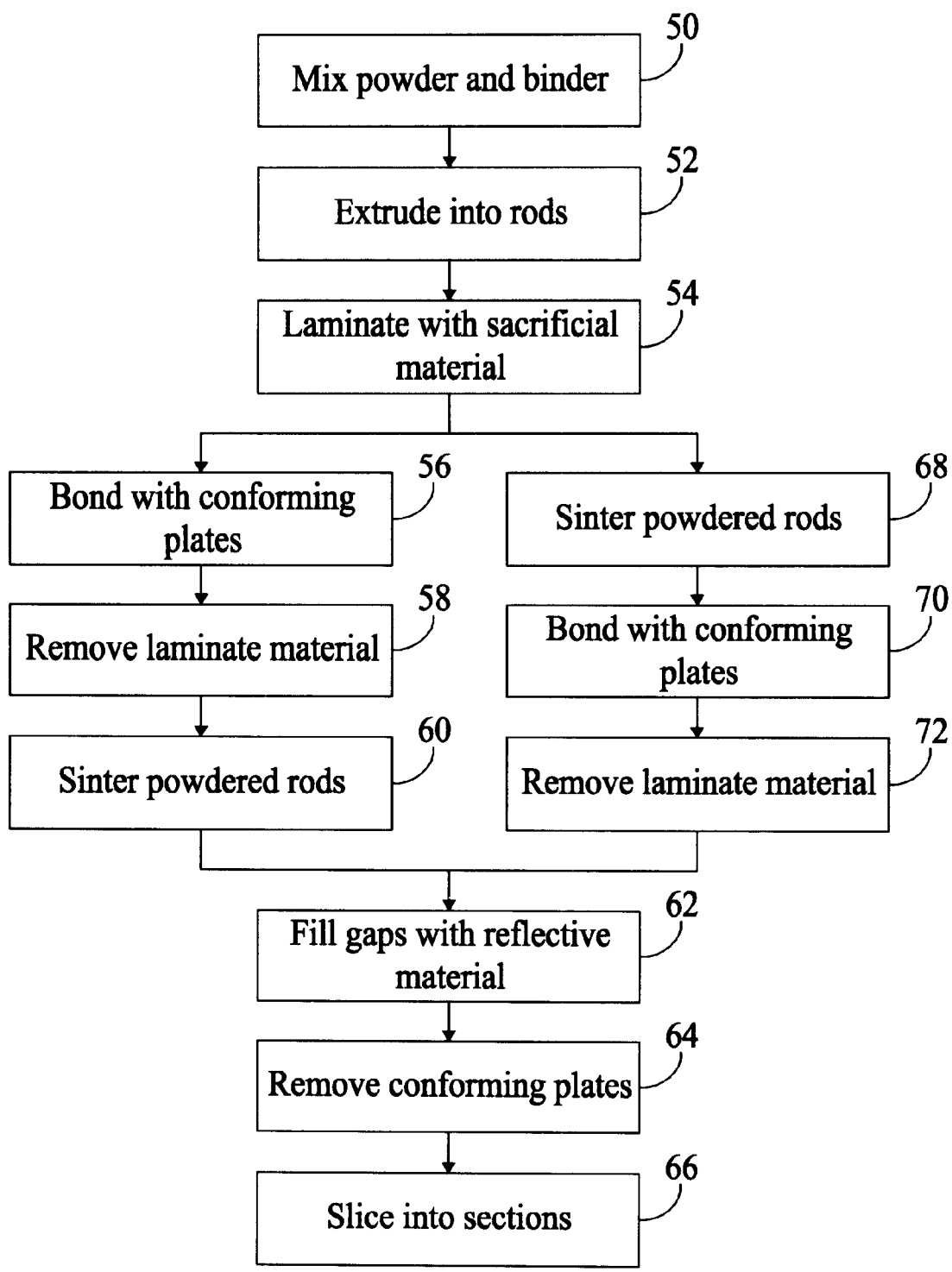
FIG. 3 is a flow chart illustrating two different method embodiments of the present inventive method for making a scintillator array.

In one embodiment of the present invention and referring to FIG. 3, a scintillator precursor is prepared by mixing 50 a temporary organic binder or gel with a scintillator powder. Suitable organic binders include organic binders or gels used in ceramic molding, such as polyethylene glycol, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Suitable scintillator powders include gadolinium oxysulfide (GdOS), Lumex ((YGd)$_2$O$_3$), cadmium tungstate (CdWO$_4$), GGG (Gd$_3$Ga$_5$O$_{12}$ garnet), bismuth germanate (BGO, Bi$_4$Ge$_3$O$_{12}$) and mixtures thereof The scintillator precursor is partially solidified or dried to make a flexible "cake," that is extruded 52 through a die or multiple dies to make a square or round rod. The rods are then cut to a length dependent upon the embodiment. The cut parts are then assembled 54 into an array with sheets, laminates or layers that comprise a low melting point or easily dissolvable sacrificial material. Suitable materials for such sheets, laminates or layers include any low melting point polymer sheet coated with adhesive, such as polyester films, MYLAR® and polycarbonate films. The sheet, laminate, or layer forms a separator between individual scintillator elements or pixels. In one embodiment, the entire separator is made of a sacrificial material.

In one embodiment, the scintillator structure is also supported 56, for example, by bonding conforming plates at cut ends or faces of the scintillators to hold extrusions in place during subsequent operations. After building the structure, the sacrificial layer is removed 58, for example, by heating the structure to a temperature at which the sacrificial layer material melts away. In one embodiment, the sacrificial layer is entirely burned out. In another embodiment, the sacrificial layer is removed by a solvent. The precursor material that remains is sintered 60 at an appropriate sintering temperature to form a scintillator array.

After sintering and removal of the sacrificial layer, the gap left by the sacrificial layer is filled 62 with a reflective material which separates each scintillator array into individual channels or pixels. Examples of suitable reflective materials include titanium dioxide ($TiO_2$), aluminum oxide ($Al_2O_3$), and barium sulfate ($BaSO_4$) powders, and mixtures thereof. The conforming plates are then removed 64 and the long scintillator array is diced or cut 66 into thinner arrays suitable for the desired application.

In one embodiment, after preparing 50 the precursor material, extruding 52 the cake, the rods are laminated 54 with a material that is not removed (or not completely removed) when the rods are sintered 68. Thus, it is not necessary to use conforming plates to hold the laminated structure together during sintering. After sintering 68, conforming plates are then applied 70 to the ends of the rods and the laminate material is then removed 72. Removal 72 of the laminate forming the sacrificial layers is accomplished, for example, by use of heat or a solvent. The gaps left by removal of the sacrificial laminate material are then filled 62, the conforming plates are removed 64, and the resulting structure cut or sliced into sections 66, as in an embodiment described above.

Figure 4:
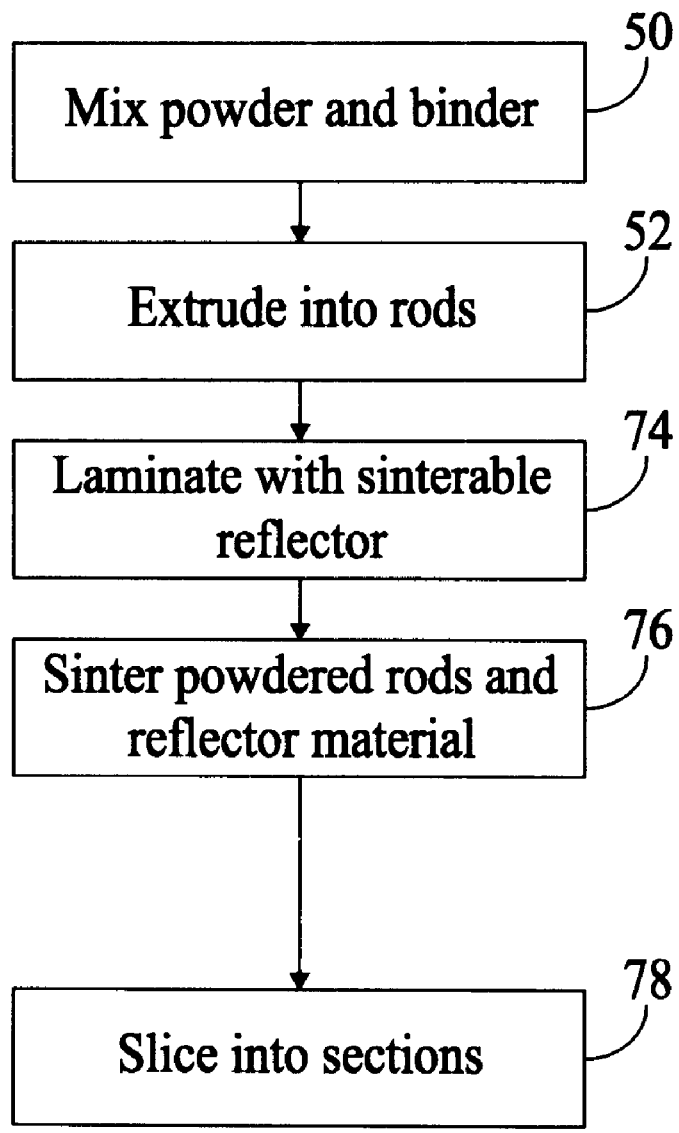
FIG. 4 is a flow chart illustrating another embodiment of the present invention for making a scintillator array.

In embodiments in which the separator layer serves as a permanent part of the array, there are no gaps to fill with reflector, so the extruded and sintered array is simply diced into a thickness appropriate for the desired application. More particularly, and referring to FIG. 4, powder and binder are mixed 50 and extruded 52 into rods, as in the embodiments of FIG. 3. The rods are then laminated (i.e., coated and joined) 74 with a sinterable reflector material. Suitable sinterable reflector materials include, for example, titanium dioxide ($TiO_2$), aluminum oxide ($Al_2O_3$), and barium sulfate ($BaSO_4$) powders, and other high temperature inorganic reflectors capable of surviving the scintillator sintering temperature, as well as mixtures of sinterable reflector materials. The rods and reflector material are then heated and sintered 76 in one operation, leaving a sintillator block that can simply be sliced 78 into sections of desired dimensions.

Figure 5:
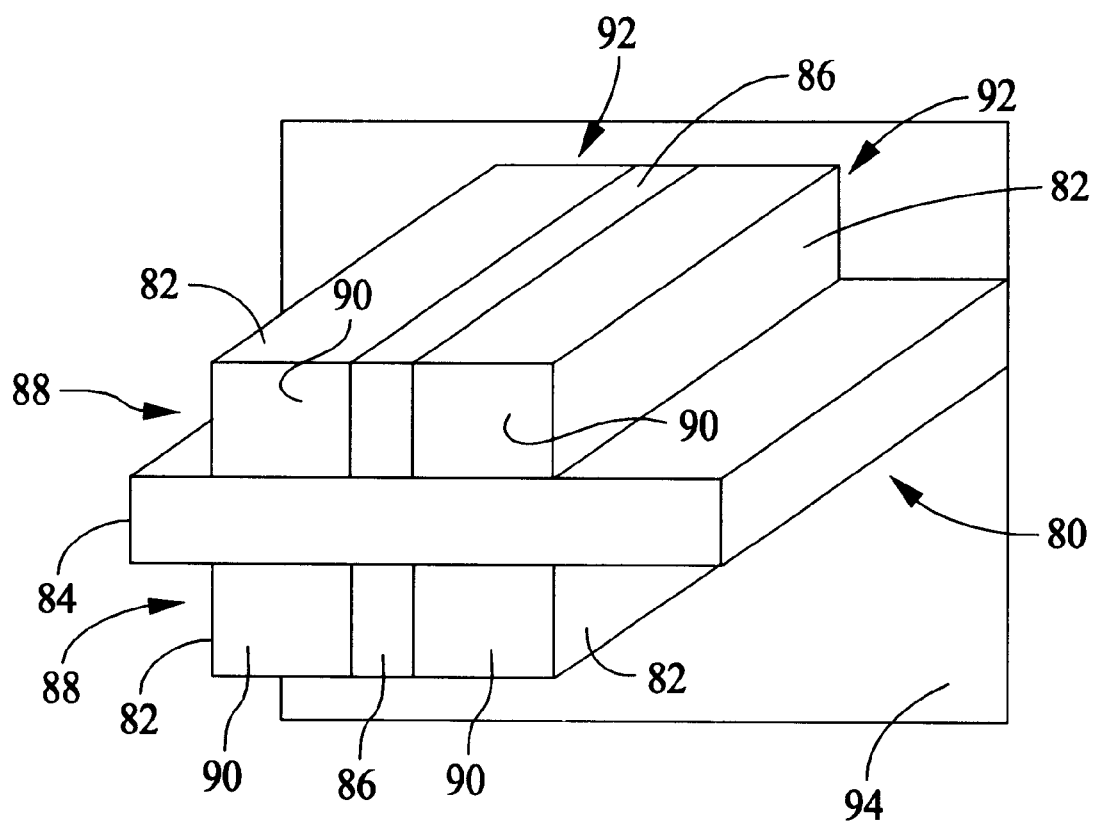
FIG. 5 is a simplified perspective representation of a scintillator block of the present invention during one stage of its fabrication.

FIG. 5 is a simplified view of one embodiment of a "laminated" scintillator block 80 comprising a plurality of rods 82 of extruded scintillator material, a sheet of sacrificial laminate material 84, and additional sacrificial material 86. Although FIG. 5 shows only four rods 82, it is illustrative of embodiments having a larger number of rods 82.

Extruded rods 82 comprising a scintillator powder and an organic binder are assembled with elongate axes parallel to one another. In FIG. 5, rods 82 have a square cross-section transverse to their elongate (extruded) dimension, having been extruded through a square die. However, other embodiments utilize round rods or rods having other geometrical shapes. Laminate 80 is assembled using sacrificial materials 84 and 86. For example, rods 82 are assembled parallel to one another, in layers 88 parallel to one another, using a sheet 84 of laminate material between layers 88. In one embodiment, sheet 84 has adhesive properties (e.g., it is coated with an adhesive) so that rods 82 adhere to sheet 84. In another embodiment, rods 82 are dipped in a sacrificial adhesive (not shown) to adhere rods 82 to sheet 84. A liquid or solid (e.g., powdered) sacrificial material 86 is applied between rods 82 in each layer. Although not shown in FIG. 5, the embodiment described herein is scalable, so that laminated block 80 embodiments of the present invention can comprise any number of layers 88, and a layer 88 can comprise any number of blocks 82. Opposite faces 90, 92 of rods 82 are then joined or bonded to conforming plates 94 (only one of which is shown in FIG. 5). In one embodiment, opposite faces 90 and 92 of rods 88 are flat and parallel to one another, so conforming plates 94 are also flat and parallel to one another.

Sacrificial laminate sheets 84 and additional sacrificial material 86 are removed by heating or by dissolution in a solvent. However, because rods 82 are bonded to conforming plates 94 at faces 90 and 92, rods 82 maintain their separation from one another, and gaps remain where sacrificial laminate sheets 84 and additional sacrificial material 86 is removed. The luminescent powder comprising rods 82 is then sintered in the rods by further heating. Gaps between rods 82 are then filled with a reflector material. Conforming plates 94 are removed, and the resulting scintillator block 80 is sliced in a direction perpendicular to the length of rods 82 and parallel to faces 90 and 92. Each slice is useful as a scintillator assembly for a detector array.

In one embodiment, a sacrificial material 86 is applied by dipping each rod 82 into a sacrificial material 86. In this embodiment, no sacrificial laminate material 84 is required. Instead, sacrificial material 86 separates rods 82 both within layers 88 and between layers 88.

In one embodiment, rods 82 are sintered prior to removal of sacrificial material 86, or 84 and 86. After sintering, sacrificial material 86, or 84 and 86 is removed and the resulting gaps filled with a reflector material (not shown in FIG. 5). Conforming plates 94 are removed and the resulting scintillator assembly 80 is diced into sections as above.

In yet another embodiment, after extrusion of rods 82, rods 82 are assembled into an array 80 using a sinterable reflector material (not shown in FIG. 5) instead of sacrificial laminate material 84 and additional laminate material 86. For example, the sinterable reflector material is provided in the form of a sheet, a coating (e.g., a liquid), or a powder. Rods 82 of sintillator powder mixture and the reflector material are then sintered together, so that there is no gap filling required, and thus, no conforming plates 94 are required. The resulting sintered assembly 80 is simply sliced into sections using cuts perpendicular to the direction of the rods.

What is claimed is:

1. A method for making a scintillator array comprising:
   extruding a mixture of a scintillator powder and a binder into rods;
   laminating the extruded rods with a sinterable reflector material; and
   sintering the laminated rods and reflector material into a scintillator block.

2. A method in accordance with claim 1 and further comprising slicing the scintillator block into sections.

3. A method in accordance with claim 1 wherein the sinterable reflector comprises a reflector material powder selected from the group consisting of titanium dioxide, aluminum oxide, barium sulfate, and mixtures thereof.

4. A method in accordance with claim 1 wherein the binder is an organic binder.

5. A method in accordance with claim 1 wherein the binder is selected from the group consisting of polyethylene glycol, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof.

6. A method in accordance with claim 1 wherein the scintillator powder is selected from the group consisting of gadolinium oxysulfide, Lumex ($(YGd)_2O_3$), cadmium tungstate, GGG ($Gd_3Ga_5O_{12}$ garnet), bismuth germanate and mixtures thereof.

7. A method for making a scintillator array comprising:
   extruding a mixture of a scintillator powder and a binder into rods;
   laminating the extruded rods with a sacrificial material;
   supporting the laminated, extruded rods;
   removing the laminated material between the supported rods;
   sintering the supported rods; and
   filling gaps between the sintered rods with a reflective material to form a scintillator array.

8. A method in accordance with claim 7 wherein the rods have faces at opposite ends, and supporting the laminated, extruded rods comprises bonding conforming plates at opposite ends of the rods.

9. A method in accordance with claim 7 and further comprising slicing the scintillator block into sections.

10. A method in accordance with claim 7 wherein the reflector comprises a powder selected from the group consisting of titanium dioxide, aluminum oxide, barium sulfate, and mixtures thereof.

11. A method in accordance with claim 7 wherein the binder is an organic binder.

12. A method in accordance with claim 7 wherein the binder is selected from the group consisting of polyethylene glycol, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof.

13. A method in accordance with claim 7 wherein the scintillator powder is selected from the group consisting of gadolinium oxysulfide, Lumex ($(YGd)_2O_3$), cadmium tungstate, GGG ($Gd_3Ga_5O_{12}$ garnet), bismuth germanate and mixtures thereof.

14. A method for making a scintillator array comprising:
   extruding a mixture of a scintillator powder and a binder into rods;
   laminating the extruded rods with a sacrificial material;
   sintering the laminated, extruded rods;
   supporting the sintered, laminated rods;
   removing the laminated material between the supported rods; and
   filling gaps between the supported rods with reflective material to form a scintillator block.

15. A method in accordance with claim 14 wherein the rods have faces at opposite ends, and supporting the laminated, extruded rods comprises bonding conforming plates at opposite ends of the rods.

16. A method in accordance with claim 14 and further comprising slicing the scintillator block into sections.

17. A method in accordance with claim 14 wherein the reflector comprises a powder selected from the group consisting of titanium dioxide, aluminum oxide, barium sulfate, and mixtures thereof.

18. A method in accordance with claim 14 wherein the binder is an organic binder.

19. A method in accordance with claim 14 wherein the binder is selected from the group consisting of polyethylene glycol, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof.

20. A method in accordance with claim 14 wherein the scintillator powder is selected from the group consisting of gadolinium oxysulfide, Lumex ($(YGd)_2O_3$), cadmium tungstate, GGG ($Gd_3Ga_5O_{12}$ garnet), bismuth germanate and mixtures thereof.

21. A scintillator array comprising a plurality of parallel sintered rods and a reflective material disposed between said parallel sintered rods wherein said reflective material between said parallel sintered rods is also sintered.

22. A scintillator array in accordance with claim 21 wherein said parallel sintered rods comprise a scintillator powder selected from the group consisting of gadolinium oxysulfide, Lumex ($(YGd)_2O_3$), cadmium tungstate, GGG ($Gd_3Ga_5O_{12}$ garnet), bismuth germanate and mixtures thereof.

23. A scintillator array in accordance with claim 21 wherein said sintered reflective material comprises a powder selected from the group consisting of titanium dioxide, aluminum oxide, barium sulfate, and mixtures thereof.

24. A computed tomographic imaging system comprising:
   a rotating gantry;
   a detector array on said rotating gantry; and
   an x-ray source on said rotating gantry opposite said detector array and configured to direct a radiation beam through an object towards said detector array;
   said detector array comprising a plurality of sintered scintillator elements that produce light in response to x-ray radiation, a reflective material disposed between said scintillator elements wherein said reflective material is also sintered, and said detector array configured to convert said light to electrical signals to represent an intensity of said x-ray beam.

* * * * *